(12) United States Patent
Rofougaran

(10) Patent No.: US 7,978,783 B2
(45) Date of Patent: Jul. 12, 2011

(54) RF POLAR TRANSMITTER WITH CONTROLLED AMPLITUDE MODULATION AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 733 days.

(21) Appl. No.: 12/030,490

(22) Filed: Feb. 13, 2008

(65) Prior Publication Data

US 2009/0203334 A1 Aug. 13, 2009

(51) Int. Cl.
*H04L 27/00* (2006.01)
(52) U.S. Cl. .................................. 375/295
(58) Field of Classification Search .............. 375/295, 375/297, 300, 302, 312; 455/102; 348/442
See application file for complete search history.

(56) References Cited

U.S. PATENT DOCUMENTS

| | | | |
|---|---|---|---|
| 7,541,867 B2 * | 6/2009 | Taylor | 330/136 |
| 7,596,184 B2 * | 9/2009 | Ahmed | 375/296 |
| 7,672,648 B1 * | 3/2010 | Groe et al. | 455/127.2 |
| 2003/0012289 A1 * | 1/2003 | Lindoff | 375/262 |
| 2004/0266366 A1 * | 12/2004 | Robinson et al. | 455/91 |

* cited by examiner

*Primary Examiner* — Sam K Ahn
(74) *Attorney, Agent, or Firm* — Garlick Harrison & Markison; Bruce E. Stuckman

(57) ABSTRACT

A radio frequency (RF) transmitter includes a transmitter processing module that generates a phase signal that is phase modulated based on outbound data and that generates a amplitude signal that is amplitude modulated based on the outbound data, wherein the amplitude signal is generated in accordance with an amplitude transition rule that restricts an amplitude transition between consecutive amplitudes of the amplitude signal. An up-conversion module phase modulates an oscillation based on the phase signal to generate an up-converted signal. A radio transmitter front-end includes a polar amplifier that amplifies and amplitude modulates the up-converted signal based on the amplitude signal to generate a transmit signal.

18 Claims, 11 Drawing Sheets

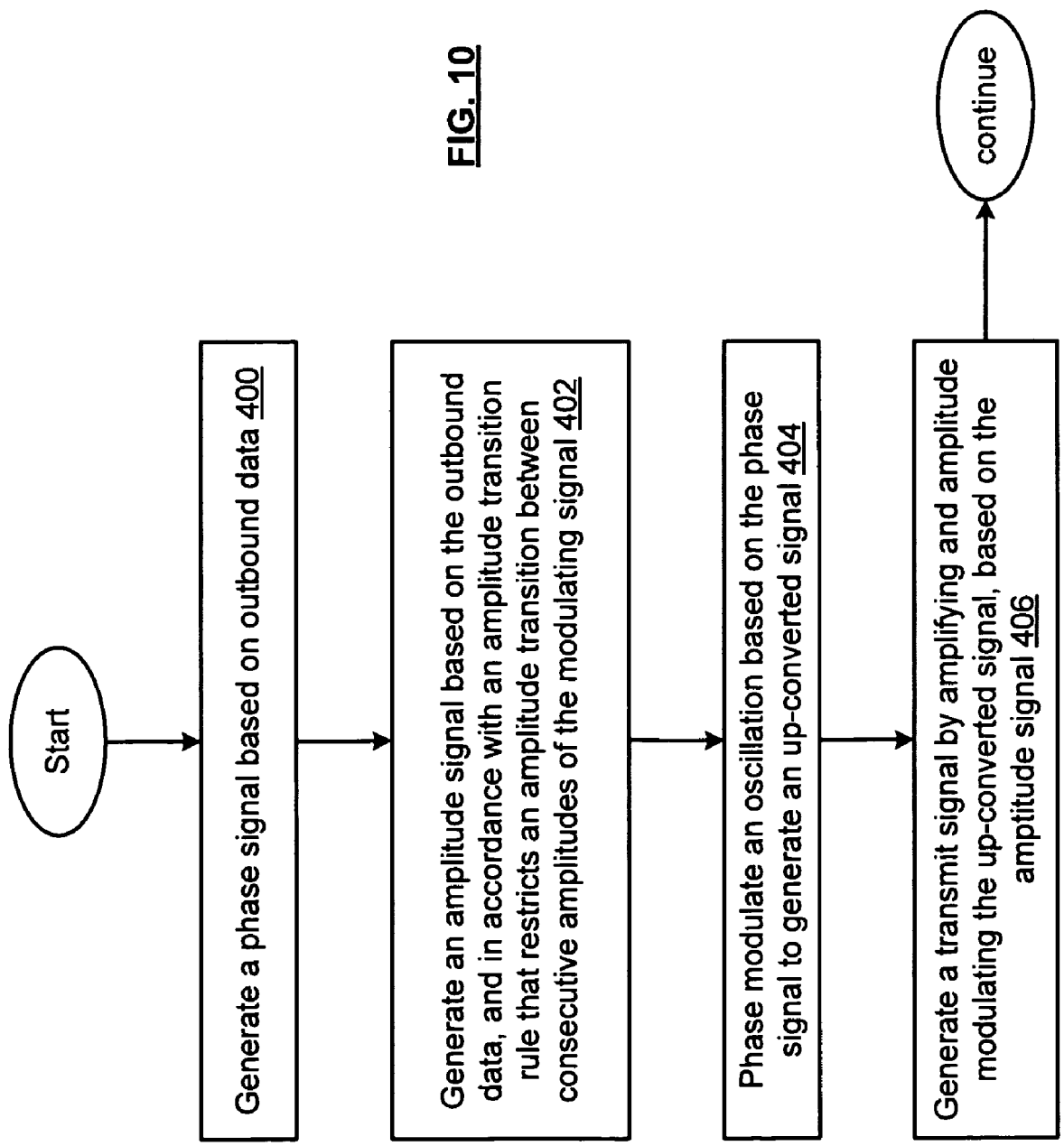

RF POLAR TRANSMITTER WITH CONTROLLED AMPLITUDE MODULATION AND METHODS FOR USE THEREWITH

CROSS-REFERENCE TO RELATED APPLICATIONS

Not applicable.

BACKGROUND OF THE INVENTION

1. Technical Field of the Invention

This invention relates generally to mobile communication devices and more particularly to RF transmitter circuits used therewith.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna through an antenna interface and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

RF transmitters can generate polar coordinate transmissions that are simultaneously amplitude modulated and phase modulated to carry more data over a single transmitted signal. The can be performed in two phases with phase modulation occurring first in a phase locked loop and amplitude modulation being induced on the phase modulated signal by the power amplifier. While a flexible approach, the power amplifier must respond to a wide range of possible amplitude signals. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 10 is a flow chart of an embodiment of a method in accordance with the present invention;

DETAILED DESCRIPTION OF THE INVENTION

Figure 1:
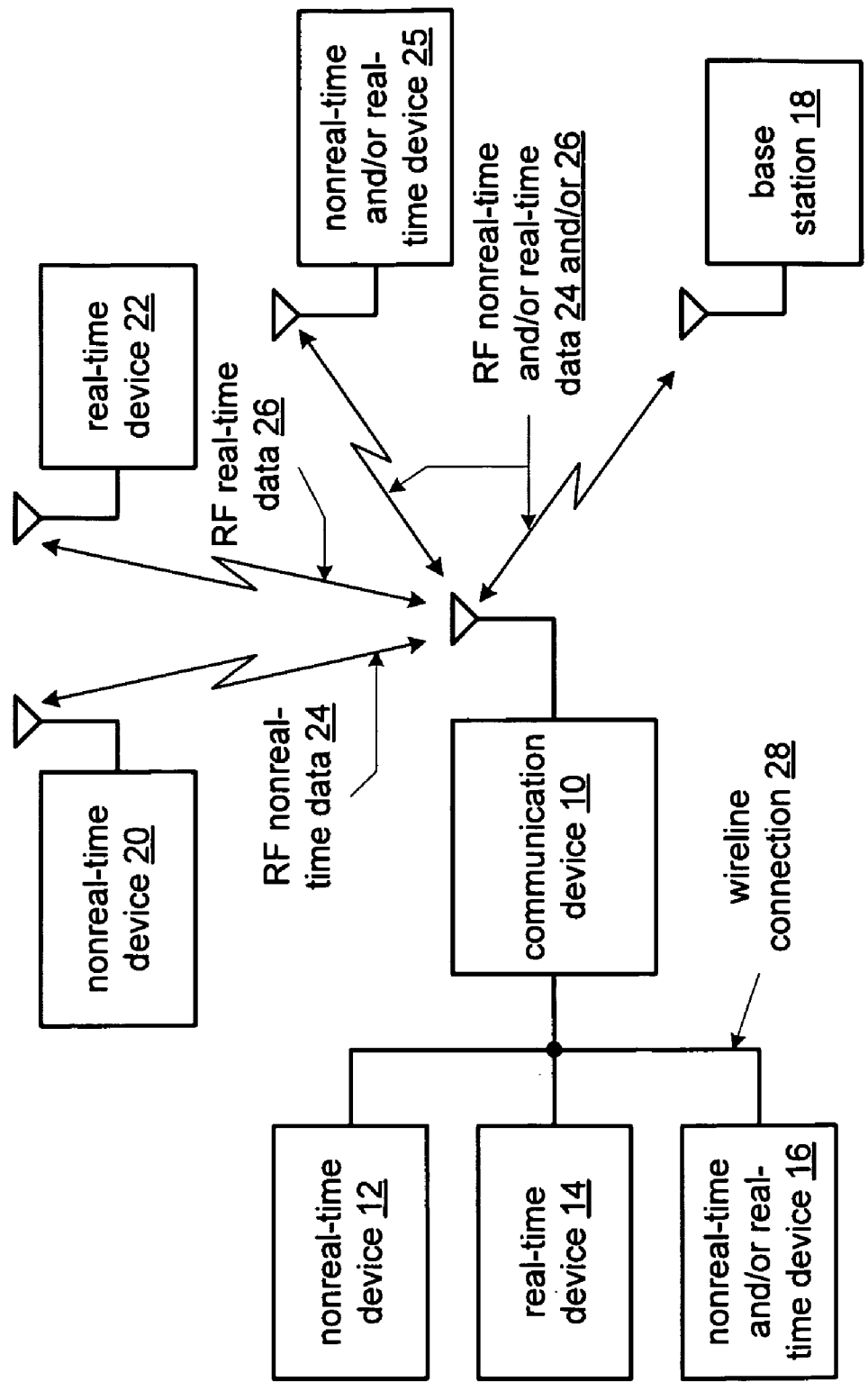
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14, 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a circuit, such as a combined voice, data and RF integrated circuit that includes one or more features or functions of the present invention. Such circuits shall be described in greater detail in association with FIGS. 3-15 that follow.

Figure 2:
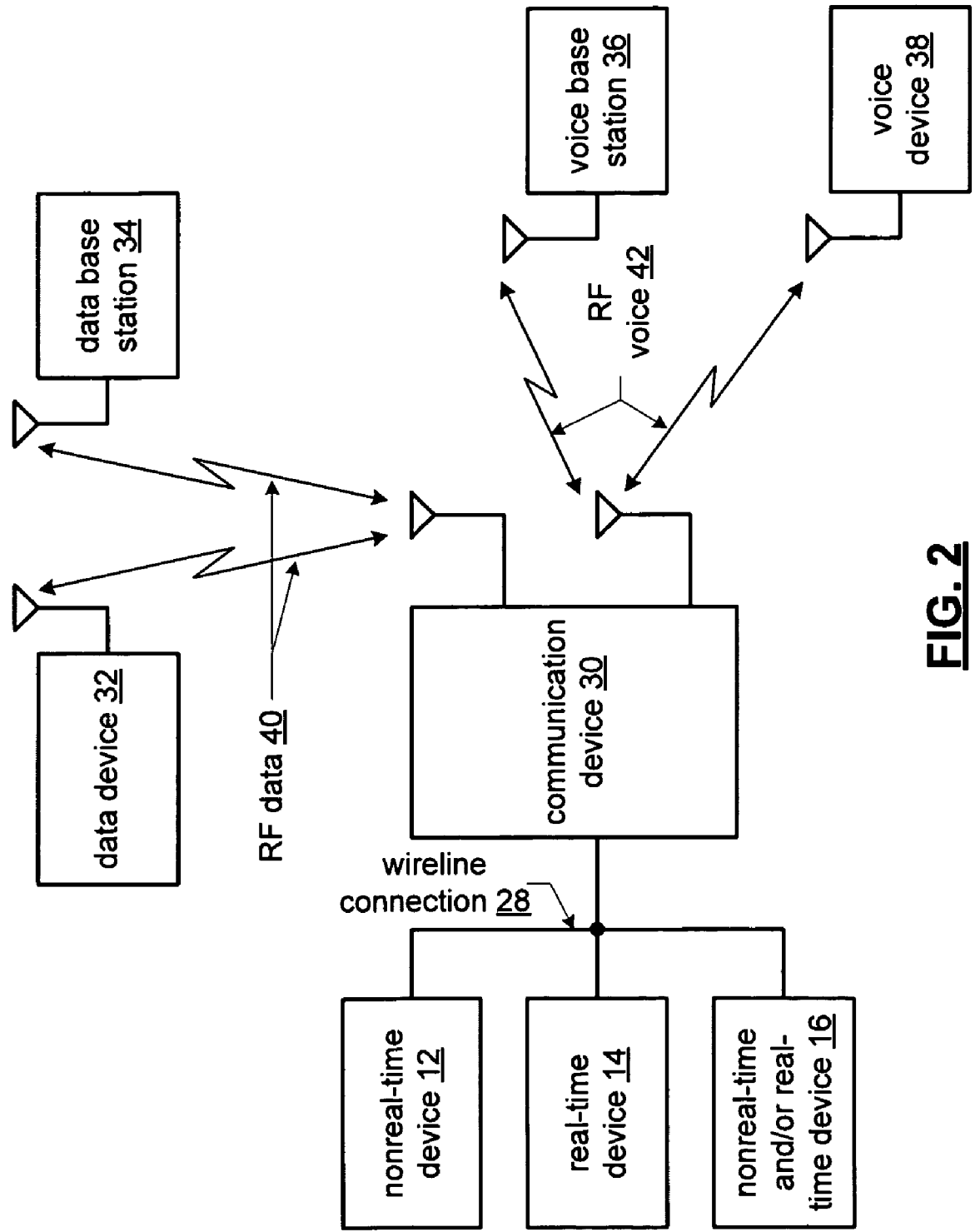
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
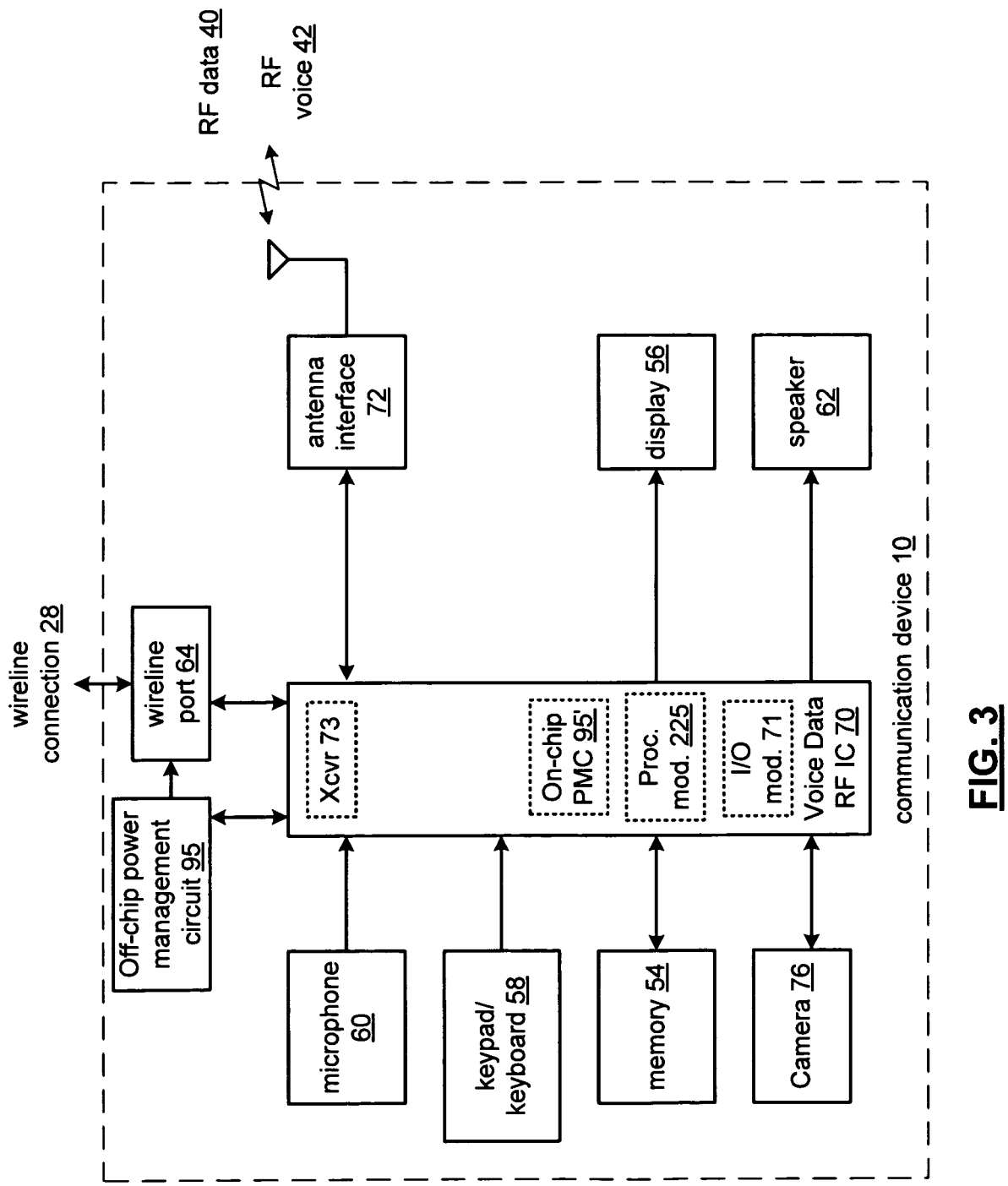
FIG. 3 is a schematic block diagram of an embodiment of an integrated circuit in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, voice data RF IC 50 includes a transceiver 73 with RF and baseband modules for formatting and modulating data and voice signals into RF real-time data 26 and non-real-time data 24 and transmitting this data via an antenna interface 72 and an antenna, and for receiving RF data and RF voice signals via the antenna. Further, voice data RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 50. Voice Data RF IC 50 optionally includes an on-chip power management circuit 95' for replacing the off-chip power management circuit 95.

In an embodiment of the present invention, the voice data RF IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the voice, data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 2. Further, RF IC 50 includes one or more controlled amplitude modulation features in accordance with the present invention that will be discussed in greater detail in association with FIG. 5-15.

Figure 4:
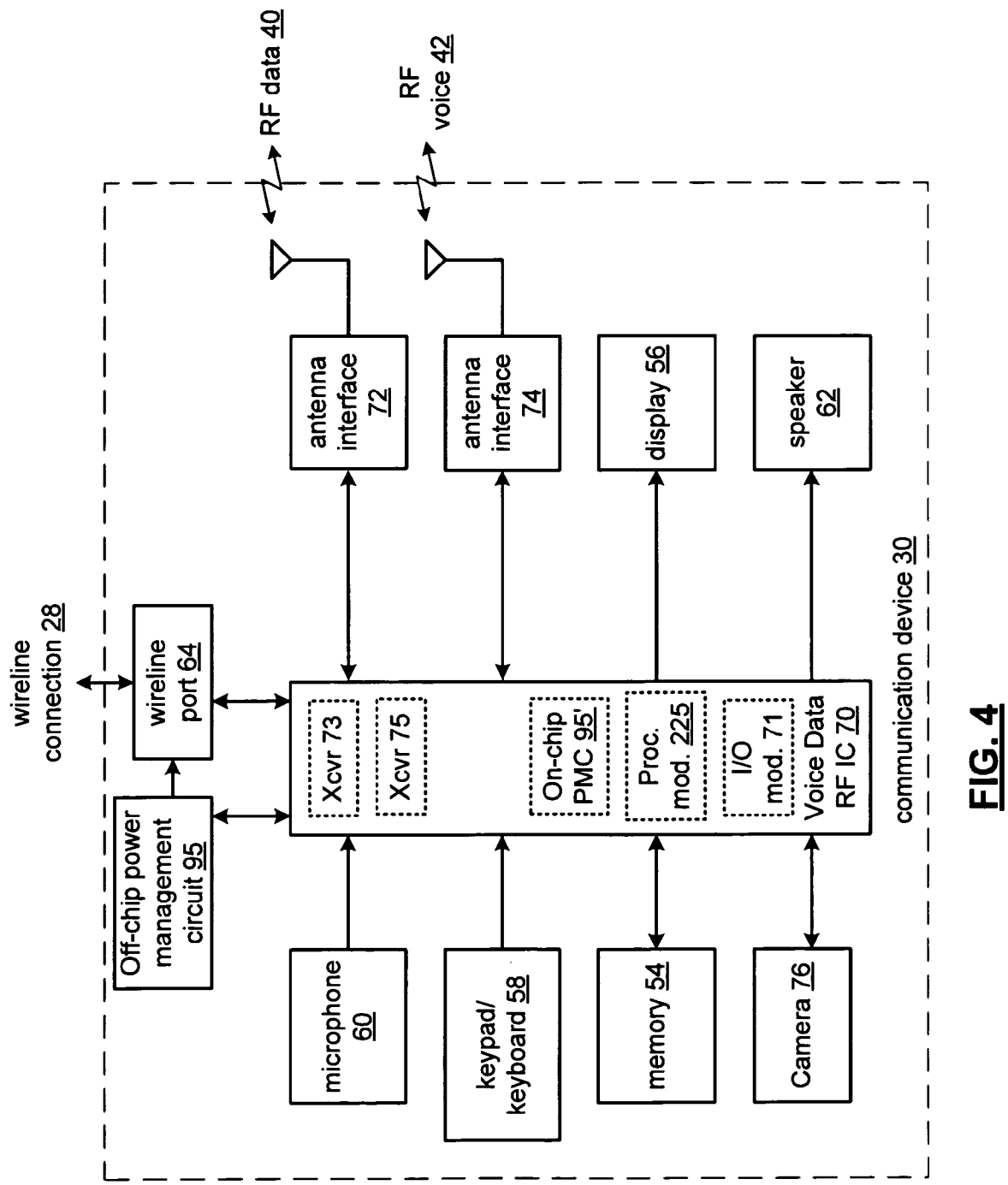
FIG. 4 is a schematic block diagram of another embodiment of an integrated circuit in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless transceivers 73 and 75 for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes one or more controlled amplitude modulation features in accordance with the present invention that will be discussed in greater detail in association with FIG. 5-15.

Figure 5:
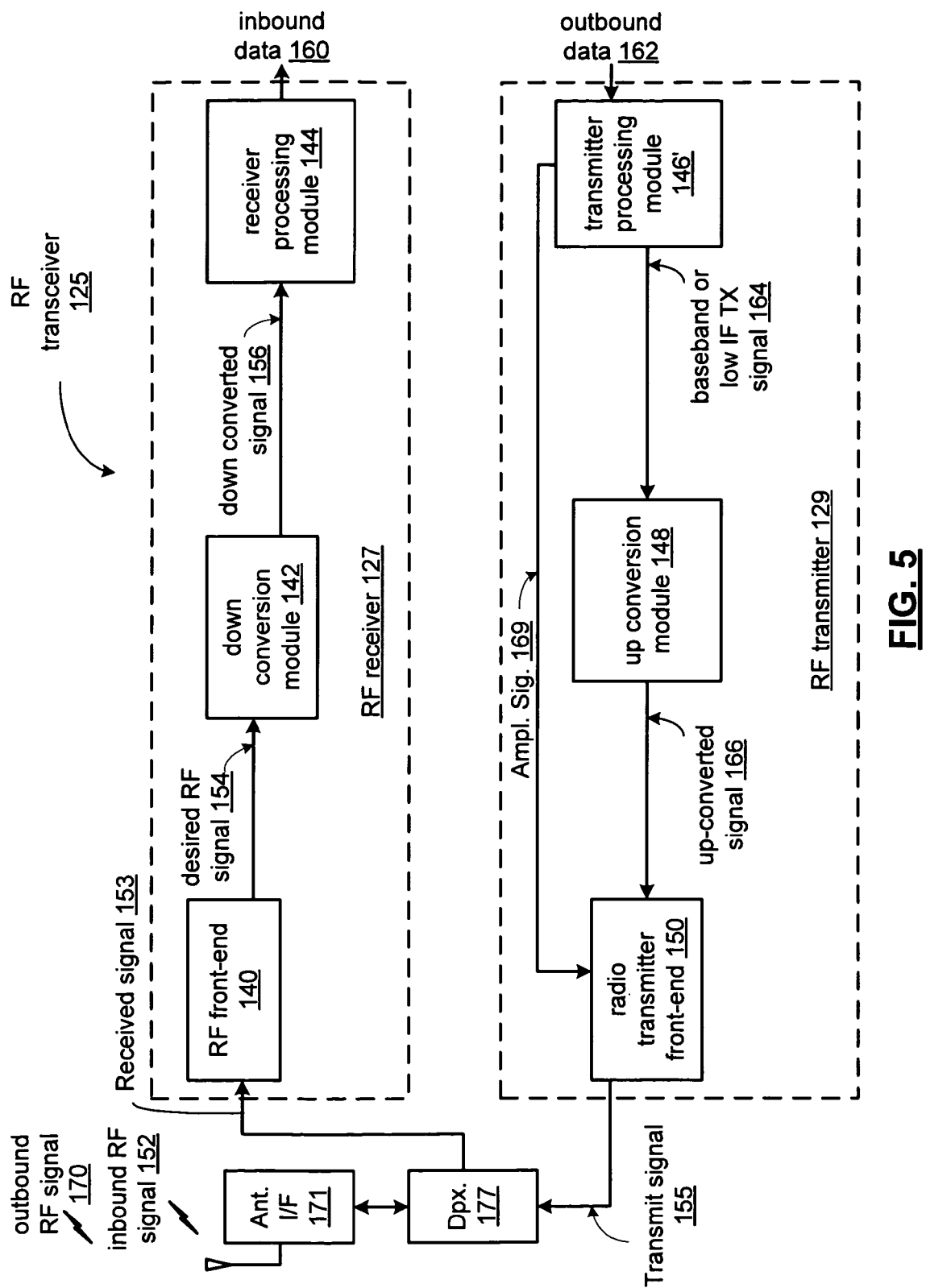
FIG. 5 is a schematic block diagram of an embodiment of an RF transceiver in accordance with the present invention.

FIG. 5 is a schematic block diagram of an RF transceiver 125, such as transceiver 73 or 75, which may be incorporated in communication devices 10 and/or 30. The RF transceiver 125 includes an RF transmitter 129 and an RF receiver 127. The RF receiver 127 includes an RF front end 140, a down conversion module 142, and a receiver processing module 144. The RF transmitter 129 includes a transmitter processing module 146, an up conversion module 148, and a radio transmitter front-end 150.

As shown, the transmitter is coupled to an antenna through power amplifier module 180, off-chip antenna interface 171 and a diplexer (duplexer) 177, that couples the transmit signal 155 to the antenna to produce outbound RF signal 170 and couples inbound RF signal 152 to produce received signal 153. While a diplexer is shown, a transmit/receive switch could likewise be employed for the same purpose. While a single antenna is represented, the receiver and transmitter may each employ separate antennas or share a multiple antenna structure that includes two or more antennas. In another embodiment, the receiver and transmitter may share a multiple input multiple output (MIMO) antenna structure that includes a plurality of antennas. Each antenna may be fixed, programmable, an antenna array or other antenna configuration. Accordingly, the antenna structure of the wireless transceiver could also depend on the particular standard(s) to which the wireless transceiver is compliant and the applications thereof.

In operation, the RF transmitter 129 produces a transmit signal 155 that includes a polar coordinate transmission having a carrier wave that is amplitude modulated and phase modulated by separate modulation signals. The transmitter receives outbound data 162 from a host device or other source via the transmitter processing module 146. The transmitter processing module 146 processes the outbound data 162 to produce separate amplitude and phase signals such as amplitude signal 169 and a phase signal represented as baseband or low IF TX signals 164 that may be baseband signals (e.g., have a zero IF) or low IF signals, where the low IF typically will be in a frequency range of one hundred kilohertz to a few megahertz.

Outbound data 162 is processed by transmitter processing module 146 to amplitude/phase pairs that represent this data. In particular, n-tuples of the outbound data 162 are mapped into a single amplitude/phase pair with one of i discrete amplitudes and one of j discrete phases. Popular examples include 4-bit quadrature amplitude modulation having 16 unique phase and amplitude combinations (16-QAM), as well as 64-QAM, 128-QAM, 256-QAM, and other modulation methods. After the outbound data 162 is mapped to amplitude/phase pairs, the discrete amplitudes and discrete phases are implemented as separate phase and amplitude signals such as amplitude signal 169 and baseband or low IF TX signals 164. Note that the processing performed by the transmitter processing module 146 can include, but is not limited to, scrambling, encoding, puncturing, as well as the mapping, modulation, and/or baseband to IF conversion discussed above.

In an embodiment of the present invention, the polar amplifier of transmitter front end 150 that may not be able to reliably respond to fast amplitude transitions, such as transitions in consecutive symbols from the maximum amplitude to the minimum amplitude or minimum amplitude to the maximum amplitude, due to slew rate, output capacitance or other limitations. The output of the polar transmitter processing module 146 generates an amplitude signal 169 in accordance with an amplitude transition rule that restricts an amplitude transition between consecutive amplitudes of the amplitude signal to avoid or reduce these fast transitions. In particular, the amplitude transition rule can operate to restrict an amplitude transition between consecutive amplitudes of the amplitude signal to be less that the difference between a maximum amplitude of the amplitude signal and a minimum amplitude of the amplitude signal of some lesser difference to accommodate the need of the polar amplifier to reduce fast amplitude transitions.

Transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Further features of transmitter processing module 146 will be described in conjunction with FIGS. 6-8 and 10-15 that follow.

The up conversion module 148 can include a filtering and/or gain module, and an up-conversion section. The filtering and/or gain module filters and/or adjusts the gain of the signals prior to providing it to an up-conversion section. The up-conversion section converts the baseband or low IF signals into up converted signals 166 based on an oscillation such as an RF carrier frequency signal. In particular, the up conversion module 148 phase modulates the RF carrier frequency oscillation, based on the phase signal, such as baseband or low IF transmit signal 164. In an embodiment of the present invention, a phase locked loop circuit or other phase/frequency modulator is used for this purpose. Up conversion module 148 optionally includes a limiter circuit for leveling the amplitude of its output signal.

As discussed above, the radio transmitter front end 150 includes a polar amplifier that amplifies the up-converted signal 166 and amplitude modules this signal based on the amplitude signal 169 to produce transmit signal 155 and ultimately outbound RF signal 170, which may be filtered by a transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional lowpass, bandpass and/or notch filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass and/or notch filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling.

Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 6:
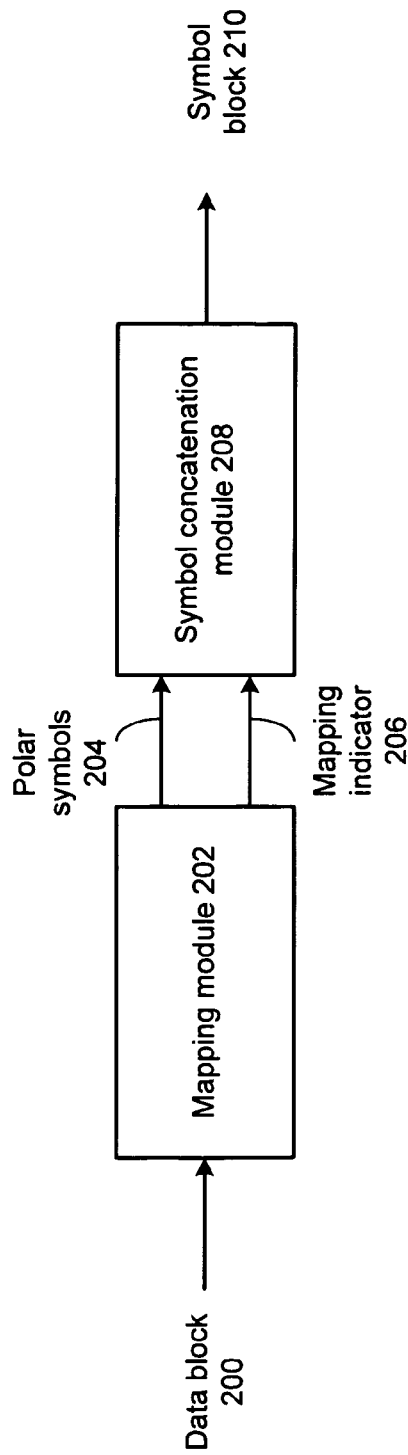
FIG. 6 is a schematic block diagram of a mapping module and symbol concatenation module in accordance with the present invention.

FIG. 6 is a schematic block diagram of a mapping module and symbol concatenation module in accordance with the present invention. A mapping module 202 and symbol concatenation module 208 are shown that can be implemented as part of transmitter processing module 146. In particular, the amplitude signal 169 and phase signal are generated based on one of a plurality of mappings of the outbound data 162 to a plurality of polar symbols 204. The outbound data is separated into data blocks 200. Mapping module 202 operates to select one of the plurality of mappings for each data block 200 based on, for instance, the amplitude transitions rule. In this fashion undesirable fast amplitude transitions can be reduced or eliminated.

In operation, mapping module 202 generates the plurality of polar symbols 204 for each block of outbound data 162, such as data block 200. Further, mapping module 202 generates a mapping indicator 206 that indicates which of the plurality of mappings was used to generate the polar symbols 204. Symbol concatenation module 208 generates a mapping symbol based on the mapping indicator and generates a symbol block 210 by concatenating the mapping symbol and the plurality of polar symbols. By sending the mapping symbol with the remaining symbols of the symbol block, a decoder can determine which mapping was used to generate the remaining symbols of the symbol block and can decode the symbols based on the particular mapping that was employed.

Figure 7:
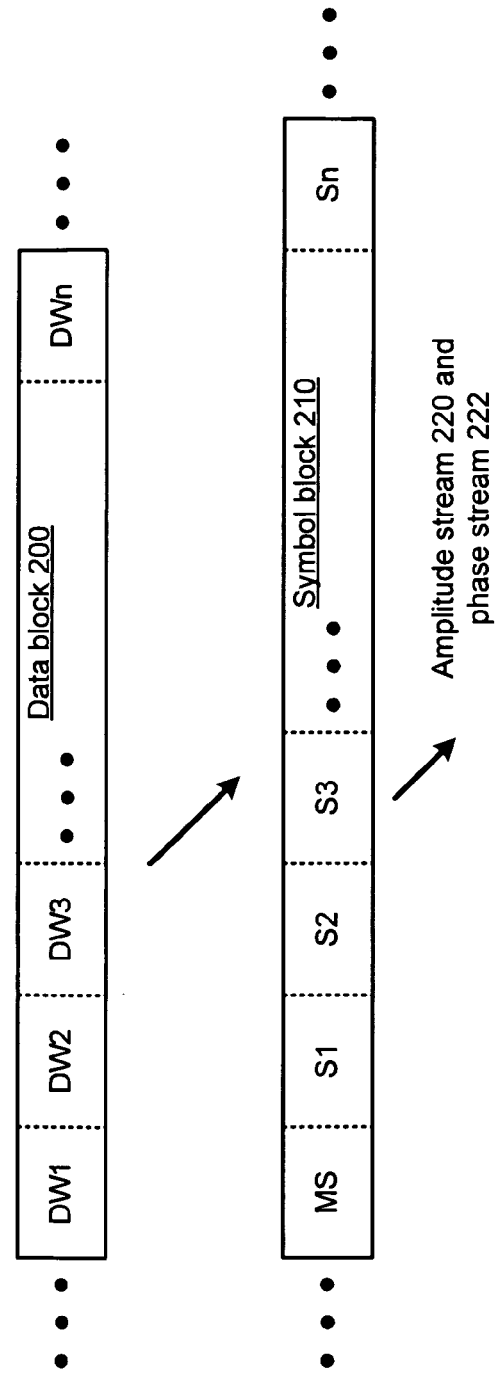
FIG. 7 is a block diagram of a data block and symbol block in accordance with the present invention.

FIG. 7 is a block diagram of a data block and symbol block in accordance with the present invention. In particular, and example is shown in accordance with the mapping module 202 and symbol concatenation module 208 of FIG. 6. Data block 200 includes n data words DW1, DW2, DW3, . . . DWn. Each data word DWi includes m bits that are mapped to a single symbol. In this fashion, DW1 is mapped to S1, DW2 is mapped to S2 and DWi is mapped to Si with a single mapping for each data block that is chosen based on the amplitude transition rule.

For instance, an amplitude transition rule can indicate that transitions between the minimum and maximum amplitude or maximum to minimum amplitude in consecutive symbols (collectively, "MIN/MAX transitions") are undesirable. In an embodiment of the present invention, the mapping module 202 can evaluate the amplitude transitions rule for the symbols generated by each possible mapping and can choose a particular mapping the generates the lowest number of MIN/MAX transitions or that has no MIN/MAX transitions altogether. It should be noted that other amplitude transition rules can likewise be employed and evaluated based on, for instance, consideration the amplitude of other transitions between consecutive symbols, etc. As shown the mapping symbol (MS) is concatenated at to the beginning of the block to facilitate easier decoding of the symbols S1, S2, S3 ... Sn, however other placements can be employed, particularly when the decoded symbol block will be buffered at the decoder. It should be noted that up to m different symbol mappings can be accommodated, however, a fewer number can also be implemented in order to facilitate more robust decoding. Further, limiting the amplitude of the mapping symbol to avoid the maximum and minimum amplitude can simplify the evaluation of the amplitude transition rule by eliminating the possibility, for instance of a MIN/MAX transition between the mapping symbol and S1.

Transmitter processing module 146 can separate the symbol stream that includes symbol block 210 into an amplitude stream 220 and phase stream 222, that are used to generate, respectively, amplitude signal 169 and baseband or low IF TX signal 164. Amplitude signal 169 and baseband or low IF TX signal 164 can be analog signals, discrete time signals or digital signals, based on the implementation of up-conversion module 148 and radio transmitter front-end 150. In an implementation where amplitude signal 169 and baseband or low IF TX signal 164 are digital signals, radio transmitter front-end 150 and up-conversion module 148 can include a digital to analog converter.

Figure 8:
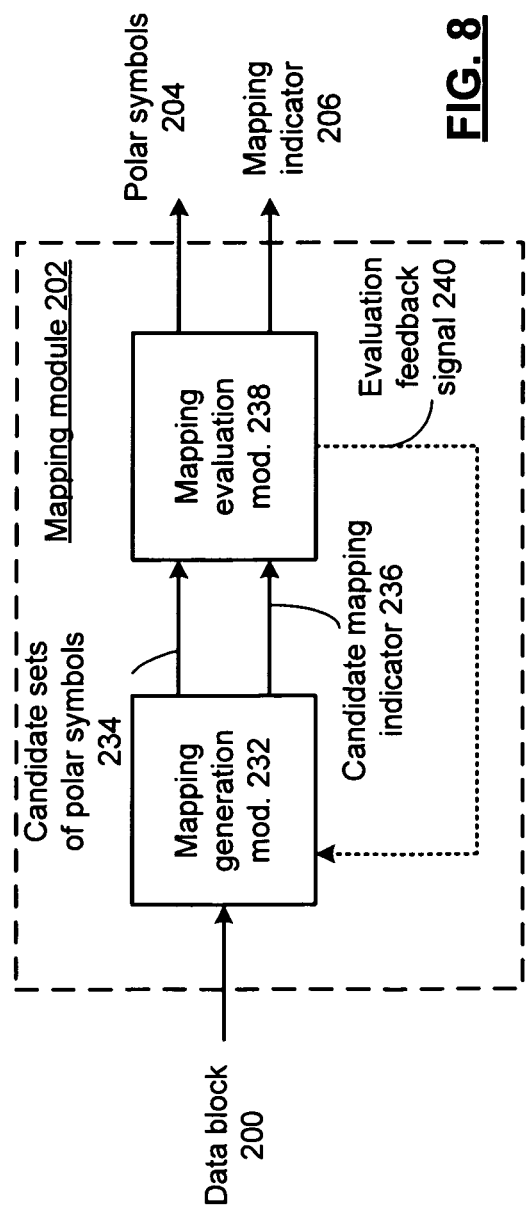
FIG. 8 is a schematic block diagram of a mapping module in accordance with the present invention.

FIG. 8 is a schematic block diagram of a mapping module in accordance with the present invention. In particular, mapping module 202 includes a mapping generation module 232 that generates candidate sets of polar symbols 234 and a corresponding candidate mapping indicator 236 based on different possible mappings. Mapping evaluation module 238 evaluates the candidate sets of polar symbols 234 based on the amplitude transition rule, and accepts a particular candidate set of polar symbols as the plurality of polar symbols 204 when the amplitude transition rule is met, such as when an acceptable level of amplitude transitions is achieved, the fast amplitude transitions are reduced, etc. When a candidate set of polar symbols 234 is acceptable for a particular data block 200, the candidate mapping indicator 236 is assigned to be the mapping indicator 206 for that data.

In an embodiment of the present invention, mapping generating module 232 generates a plurality of candidate sets of polar symbols 234 in parallel and the mapping evaluation module 238 evaluates the plurality of candidate sets of polar symbols in parallel and accepts one of the plurality of candidate sets of polar symbols as the plurality of polar symbols when the amplitude transition rule is met, such as when one of the plurality of candidate sets includes no MIN/MAX transitions or by selecting the candidate set with the fewest number of MIN/Max transitions.

In another embodiment of the present invention, the mapping generation module 232 and mapping evaluation module 238 operate in series. For instance, the mapping generation module 232 can generate candidate sets of polar symbols 234 one at a time. Further, the mapping evaluation module 238 generates an evaluation feedback signal 240 based on the evaluation of the candidate set of polar symbols 234. When the evaluation feedback signal 240 indicates that the candidate set of polar symbols 234 did not meet the amplitude transition rule, the mapping generation module generates a new candidate set of polar symbols 234. This process can proceed iteratively until the amplitude transition rule is met. In response, the candidate set of polar symbols 234 that met the amplitude transition rule for the particular data block 200 are assigned as polar symbols 204 and candidate mapping indicator that indicates the mapping used is assigned as the mapping indicator 206.

Figure 9:
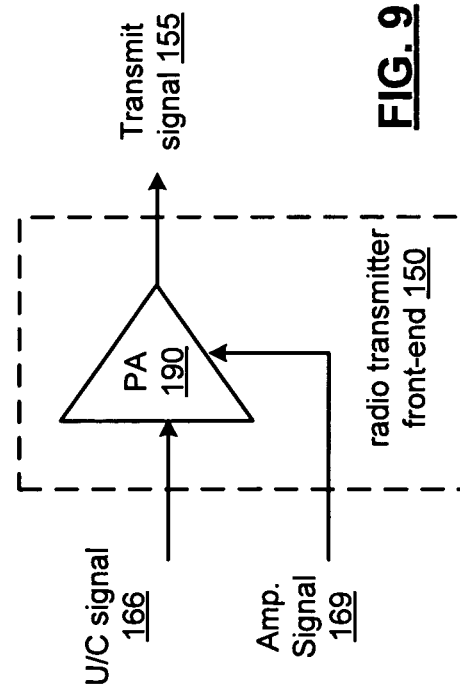
FIG. 9 is a schematic block diagram of an embodiment of a radio transmitter front-end in accordance with the present invention.

FIG. 9 is a schematic block diagram of an embodiment of a radio transmitter front-end in accordance with the present invention. In this embodiment, radio transmitter front-end 150 is implemented with a polar amplifier 190 that generates transmit signal 155 by amplifying and amplitude modulating up-converted signal 166 based on amplitude signal 169. Polar amplifier 190 can include one or more stages including optional preamplifiers, power amplifiers or drivers along with at least one stage that amplitude modulates the signal by the amplitude signal 169 via mixing, multiplying, squaring, etc.

FIG. 10 is a flow chart of an embodiment of a method in accordance with the present invention. In particular, a method is presented for use in conjunction with one or more of the functions and features described in conjunction with FIGS. 1-9. In step 400, a phase signal is generated based on outbound data. In step 402, an amplitude signal is generated based on the outbound data, and in accordance with an amplitude transition rule that restricts an amplitude transition between consecutive amplitudes of the amplitude signal. In step 404, an oscillation is phase-modulated based on the phase signal to generate an up-converted signal. In step 406, a transmit signal is generated by amplifying and amplitude modulating the up-converted signal, based on the amplitude signal.

In an embodiment of the present invention, the amplitude transition rule restricts an amplitude transition between consecutive amplitudes of the amplitude signal to be less that the difference between a maximum amplitude of the amplitude signal and a minimum amplitude of the amplitude signal. In steps 400 and 402, the amplitude signal and phase signal can be generated based on one of a plurality of mappings of the outbound data to a plurality of polar symbols. The transmitted signal can be formatted in accordance with at least one of: wireless local area network protocol, a wireless telephony protocol, a wireless data protocol, and a personal area network protocol.

Figure 11:
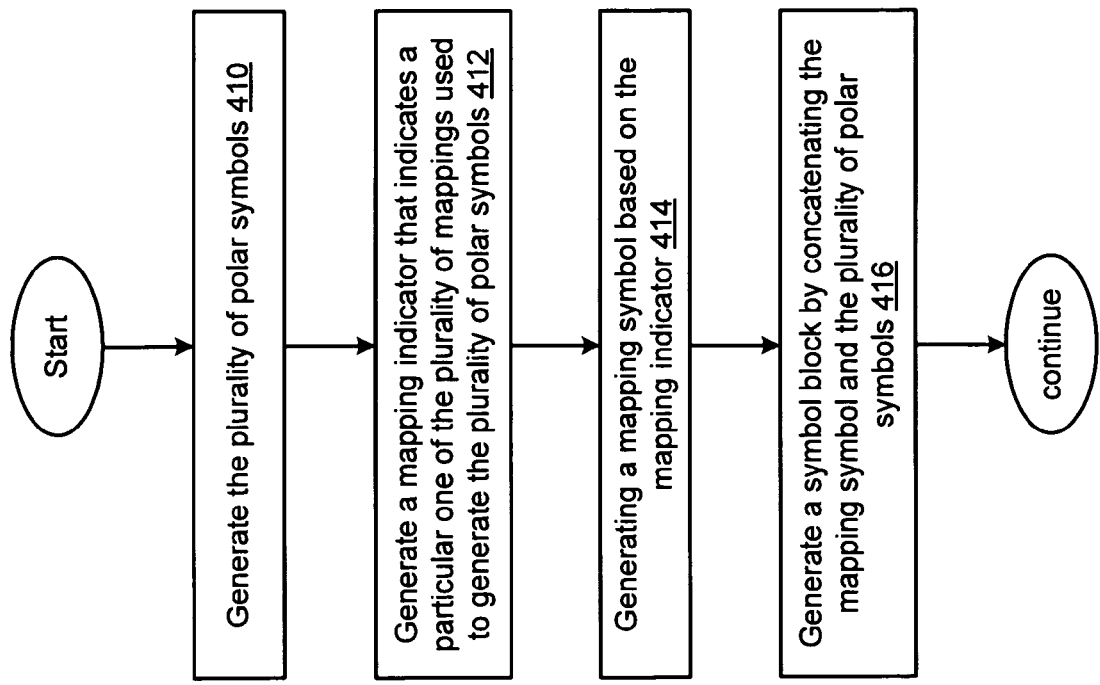
FIG. 11 is a flow chart of an embodiment of a method in accordance with the present invention.

FIG. 11 is a flow chart of an embodiment of a method in accordance with the present invention. In particular, a method is presented for use in conjunction with one or more of the functions and features described in conjunction with FIGS. 1-10. In step 410, a plurality of polar symbols are generated. In step 412, a mapping indicator is generated that indicates a particular one of a plurality of mappings used to generate the plurality of polar symbols. In step 414, a mapping symbol is generated based on the mapping indicator. In step 416, a symbol block is generated by concatenating the mapping symbol and the plurality of polar symbols.

Figure 12:
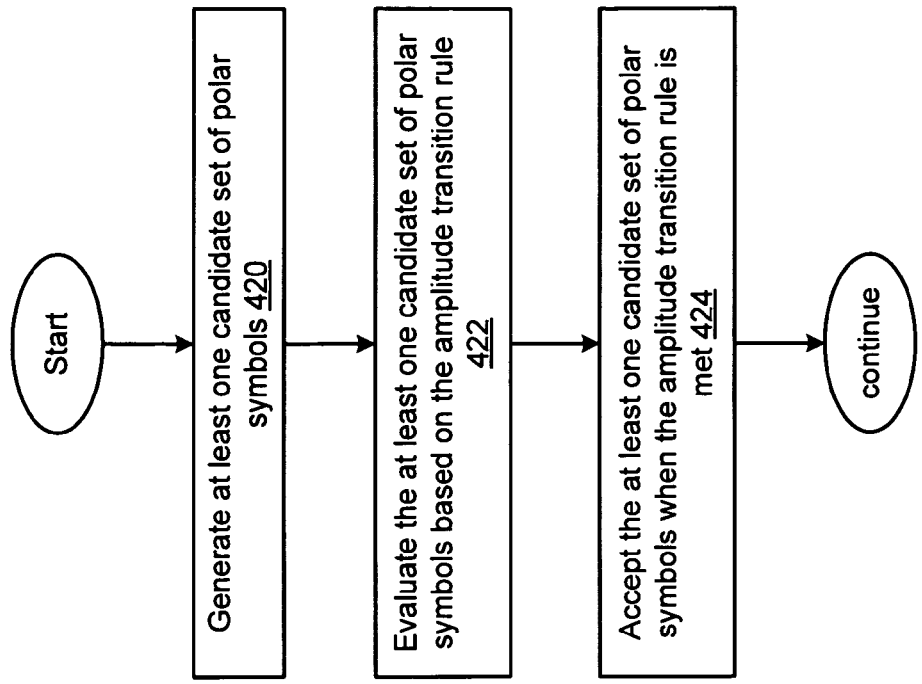
FIG. 12 is a flow chart of an embodiment of a method in accordance with the present invention.

FIG. 12 is a flow chart of an embodiment of a method in accordance with the present invention. In particular, a method is presented for use in conjunction with step 410 of FIG. 11. In step 420, at least one candidate set of polar symbols is generated. In step 422, the at least one candidate set of polar symbols is evaluated based on the amplitude transition rule. In step 424, the at least one candidate set of polar symbols is accepted as the plurality of polar symbols when the amplitude transition rule is met.

Figure 13:
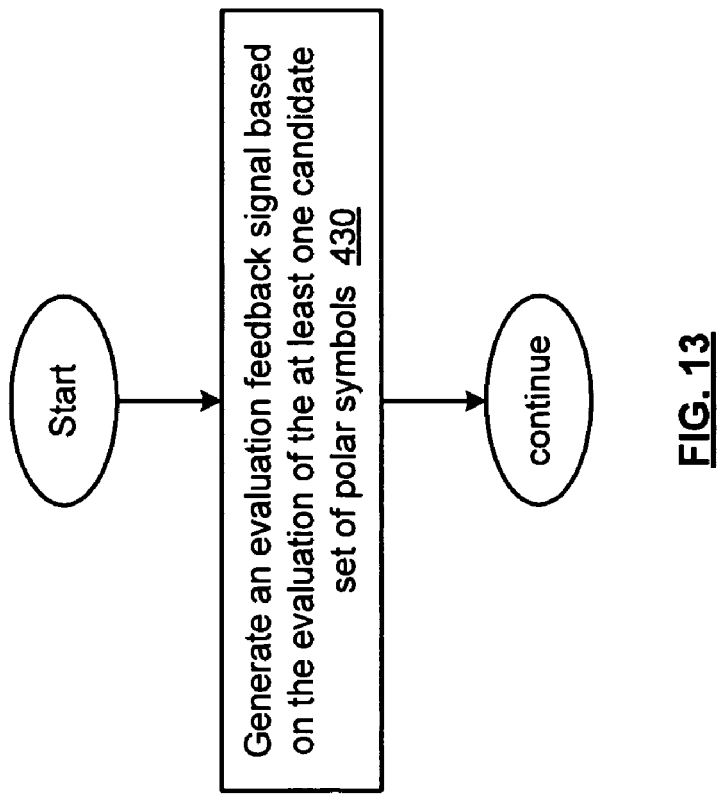
FIG. 13 is a flow chart of an embodiment of a method in accordance with the present invention.

FIG. 13 is a flow chart of an embodiment of a method in accordance with the present invention. In particular, a method is presented for use in conjunction with one or more of the functions and features described in conjunction with the method of FIG. 12. In step 430, an evaluation feedback signal is generated based on the evaluation of the at least one candidate set of polar symbols.

Figure 14:
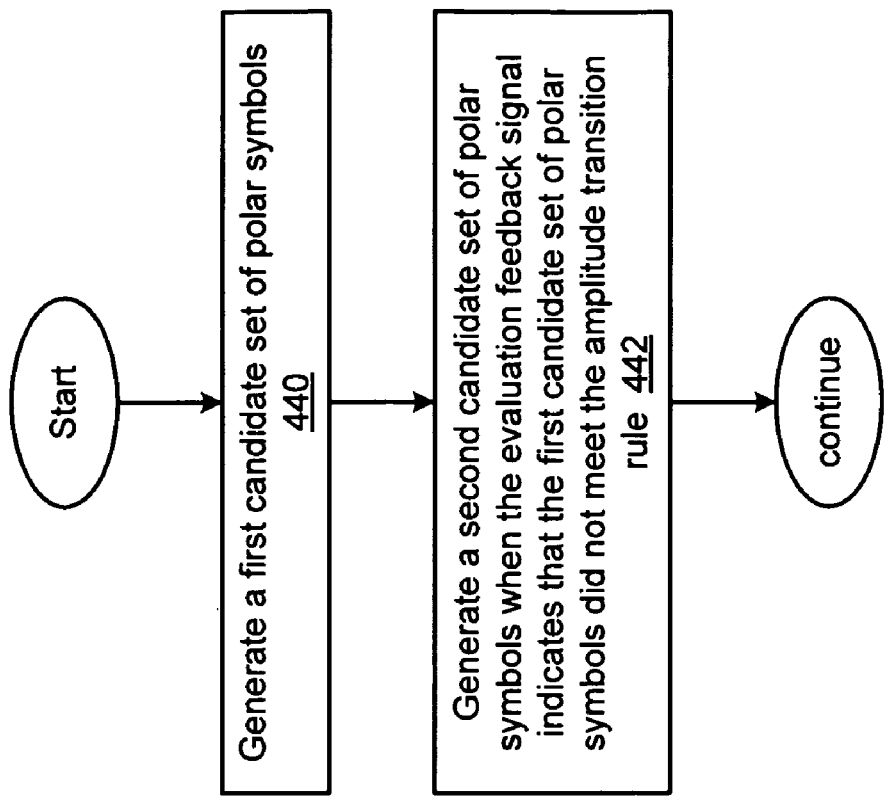
FIG. 14 is a flow chart of an embodiment of a method in accordance with the present invention.

FIG. 14 is a flow chart of an embodiment of a method in accordance with the present invention. In particular, a method is presented for use in conjunction with one or more of the functions and features described in conjunction with the method of FIG. 13. In step 440, a first candidate set of polar symbols is generated. In step 442, a second candidate set of polar symbols is generated when the evaluation feedback signal indicates that the first candidate set of polar symbols did not meet the amplitude transition rule.

Figure 15:
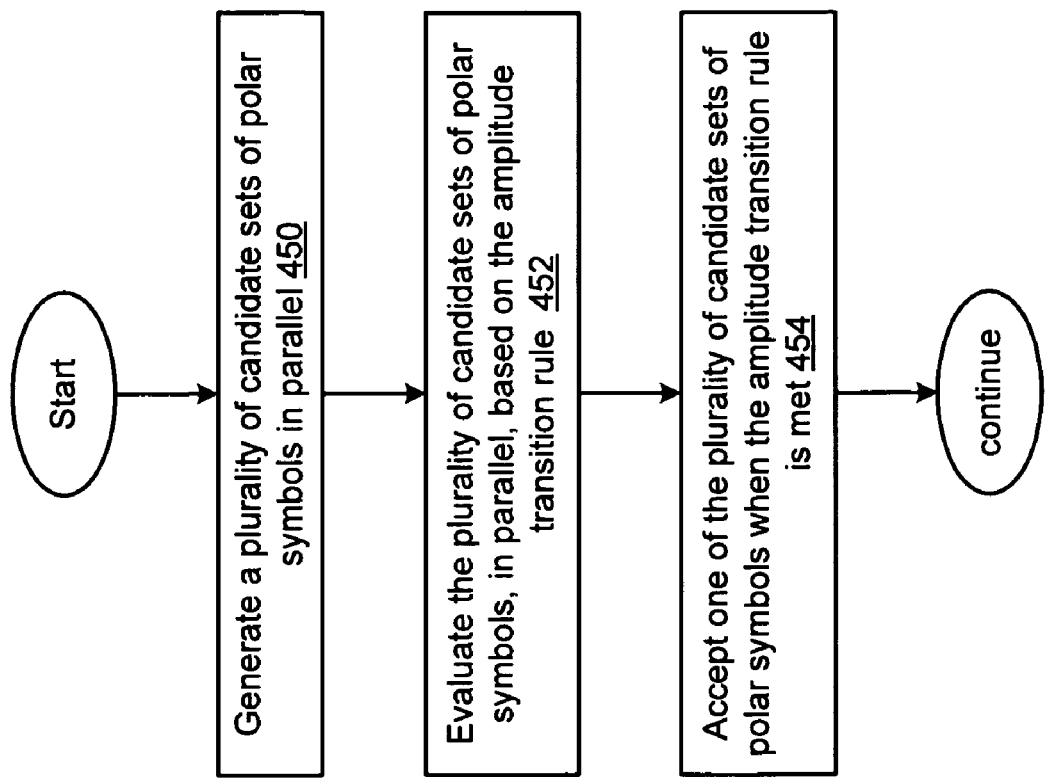
FIG. 15 is a flow chart of an embodiment of a method in accordance with the present invention.

FIG. 15 is a flow chart of an embodiment of a method in accordance with the present invention. In particular, a method is presented for use in conjunction with the method of FIG. 11. In step 450, a plurality of candidate sets of polar symbols are generated in parallel. In step 452, the plurality of candidate sets of polar symbols are evaluated, in parallel, based on the amplitude transition rule. In step 454, one of the plurality of candidate sets of polar symbols is accepted as the plurality of polar symbols when the amplitude transition rule is met.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. While the term phase modulation is used herein it includes the equivalent frequency modulation.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) transmitter comprising:
 a transmitter processing module that generates a phase signal based on outbound data and that generates an amplitude signal based on the outbound data, wherein the amplitude signal is generated in accordance with an amplitude transition rule that restricts an amplitude transition between consecutive amplitudes of the amplitude signal;
 an up-conversion module, coupled to the transmitter processing module, that phase-modulates an oscillation based on the phase signal to generate an up-converted signal; and
 a polar amplifier, coupled to the up-conversion module, that amplifies and amplitude modulates the up-converted signal based on the amplitude signal to generate a transmit signal.

2. The RF transmitter of claim 1 wherein the amplitude transition rule restricts an amplitude transition between consecutive amplitudes of the amplitude signal to be less than the difference between a maximum amplitude of the amplitude signal and a minimum amplitude of the amplitude signal.

3. The RF transmitter of claim 1 wherein the amplitude signal and the phase signal are generated based on one of a plurality of mappings of the outbound data to a plurality of polar symbols.

4. The RF transmitter of claim 3 wherein the transmitter processing module includes:
 a mapping module that generates the plurality of polar symbols and that generates a mapping indicator that indicates a particular one of the plurality of mappings used to generate the plurality of polar symbols; and
 a symbol concatenation module, coupled to the mapping module, that generates a mapping symbol based on the mapping indicator and that generates a symbol block by concatenating the mapping symbol and the plurality of polar symbols.

5. The RF transmitter of claim 4 wherein the mapping module includes:
 a mapping generation module that generates at least one candidate set of polar symbols; and
 a mapping evaluation module, coupled to the mapping generating module, that evaluates the at least one candidate set of polar symbols based on the amplitude transition rule, and accepts the at least one candidate set of polar symbols as the plurality of polar symbols when the amplitude transition rule is met.

6. The RF transmitter of claim 5 wherein the at least one candidate set of polar symbols includes a plurality of candidate sets of polar symbols that are generated in parallel by the mapping generation module, and wherein the mapping evaluation module evaluates the plurality of candidate sets of polar symbols in parallel and accepts one of the plurality of candidate sets of polar symbols as the plurality of polar symbols when the amplitude transition rule is met.

7. The RF transmitter of claim 5 wherein the mapping evaluation module generates an evaluation feedback signal based on the evaluation of the at least one candidate set of polar symbols.

8. The RF transmitter of claim 7 wherein the at least one candidate set of polar symbols includes a first candidate set of polar symbols and a second candidate set of polar symbols, and wherein the mapping generation module generates the second candidate set of polar symbols when the evaluation feedback signal indicates that the first candidate set of polar symbols did not meet the amplitude transition rule.

9. The RF transmitter of claim 1 wherein the transmit signal is in accordance with at least one of: wireless local area network protocol, a wireless telephony protocol, a wireless data protocol, and a personal area network protocol.

10. A method comprising:
generating a phase signal based on outbound data via a transmitter processing module of a transmitter;
generating an amplitude signal based on the outbound data, and in accordance with an amplitude transition rule that restricts an amplitude transition between consecutive amplitudes of the amplitude signal via the transmitter processing module;
phase-modulating an oscillation based on the phase signal to generate an up-converted signal via a phase modulator; and
generating a transmit signal by amplifying and amplitude modulating the up-converted signal via a power amplifier, based on the amplitude signal.

11. The method of claim 10 wherein the amplitude transition rule restricts an amplitude transition between consecutive amplitudes of the amplitude signal to be less that the difference between a maximum amplitude of the amplitude signal and a minimum amplitude of the amplitude signal.

12. The method of claim 10 wherein the amplitude signal and phase signal are generated based on one of a plurality of mappings of the outbound data to a plurality of polar symbols.

13. The method of claim 12 further comprising:
generating the plurality of polar symbols;
generating a mapping indicator that indicates a particular one of the plurality of mappings used to generate the plurality of polar symbols;
generating a mapping symbol based on the mapping indicator; and
generating a symbol block by concatenating the mapping symbol and the plurality of polar symbols.

14. The method of claim 13 wherein generating the plurality of polar symbols includes:
generating at least one candidate set of polar symbols;
evaluating the at least one candidate set of polar symbols based on the amplitude transition rule; and
accepting the at least one candidate set of polar symbols as the plurality of polar symbols when the amplitude transition rule is met.

15. The method of claim 14 wherein generating the plurality of polar symbols further includes:
generating an evaluation feedback signal based on the evaluation of the at least one candidate set of polar symbols.

16. The method of claim 15 wherein generating the at least one candidate set of polar symbols includes:
generating a first candidate set of polar symbols; and
generating a second candidate set of polar symbols when the evaluation feedback signal indicates that the first candidate set of polar symbols did not meet the amplitude transition rule.

17. The method of claim 13 wherein generating the plurality of polar symbols includes:
generating a plurality of candidate sets of polar symbols in parallel;
evaluating the plurality of candidate sets of polar symbols, in parallel, based on the amplitude transition rule; and
accepting one of the plurality of candidate sets of polar symbols as the plurality of polar symbols when the amplitude transition rule is met.

18. The method of claim 10 wherein the transmitted signal is in accordance with at least one of: wireless local area network protocol, a wireless telephony protocol, a wireless data protocol, and a personal area network protocol.

* * * * *

UNITED STATES PATENT AND TRADEMARK OFFICE
CERTIFICATE OF CORRECTION

PATENT NO. : 7,978,783 B2  Page 1 of 1
APPLICATION NO. : 12/030490
DATED : July 12, 2011
INVENTOR(S) : Ahmadreza Rofougaran It is certified that error appears in the above-identified patent and that said Letters Patent is hereby corrected as shown below:

Col. 13, line 38, in claim 11: after "be less" replace "that" with --than--

Signed and Sealed this
Twenty-seventh Day of November, 2012

David J. Kappos
*Director of the United States Patent and Trademark Office*